Patented Oct. 28, 1952

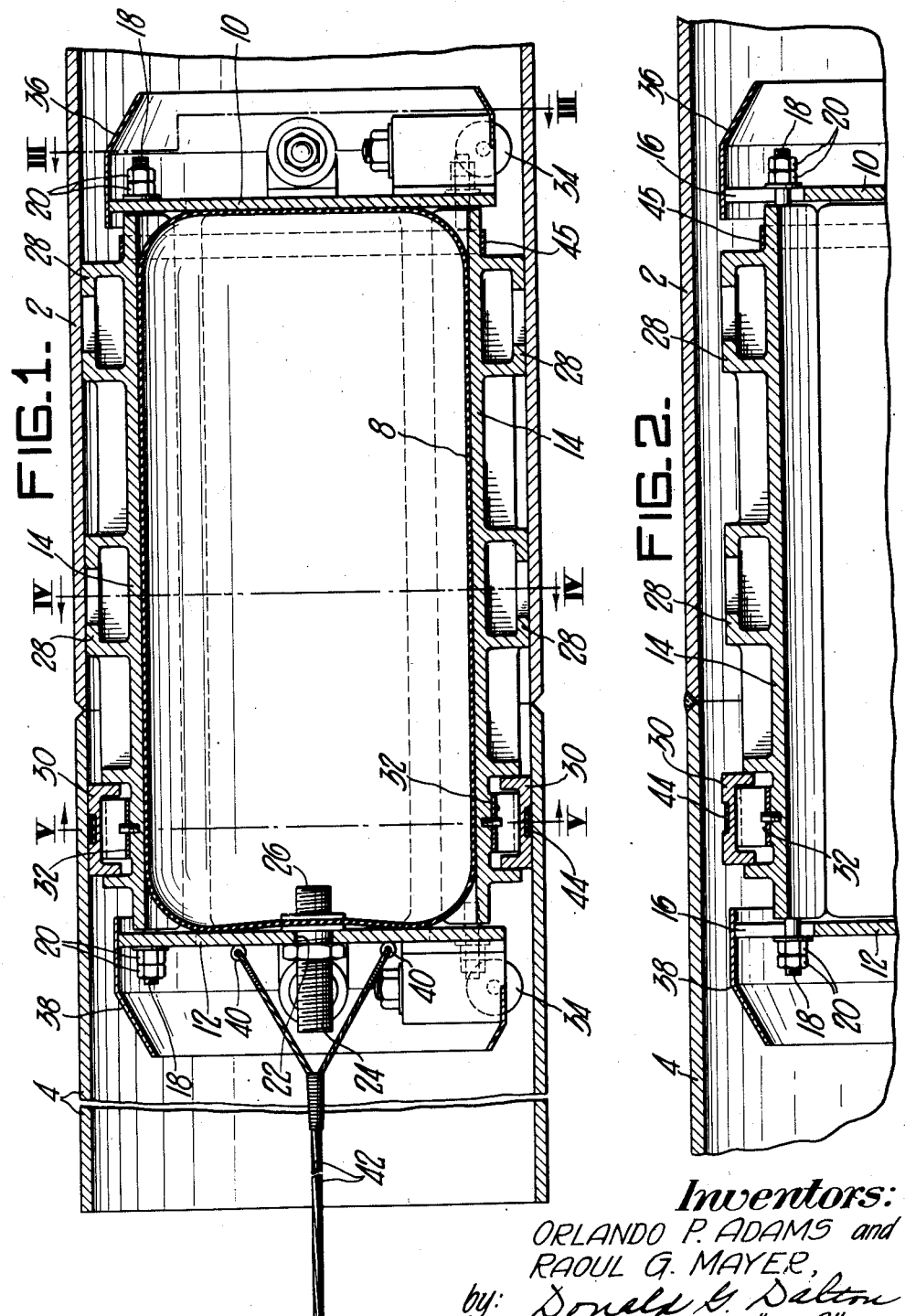

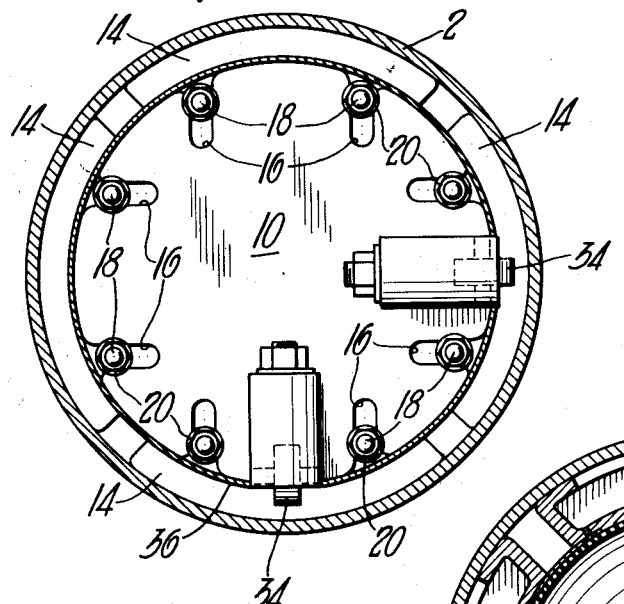
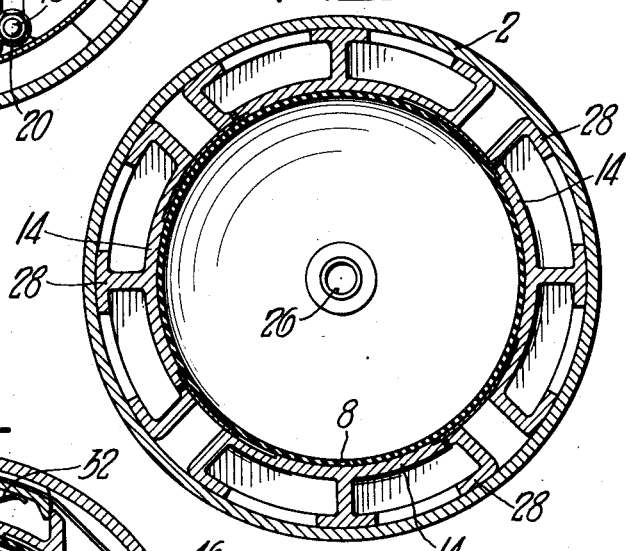
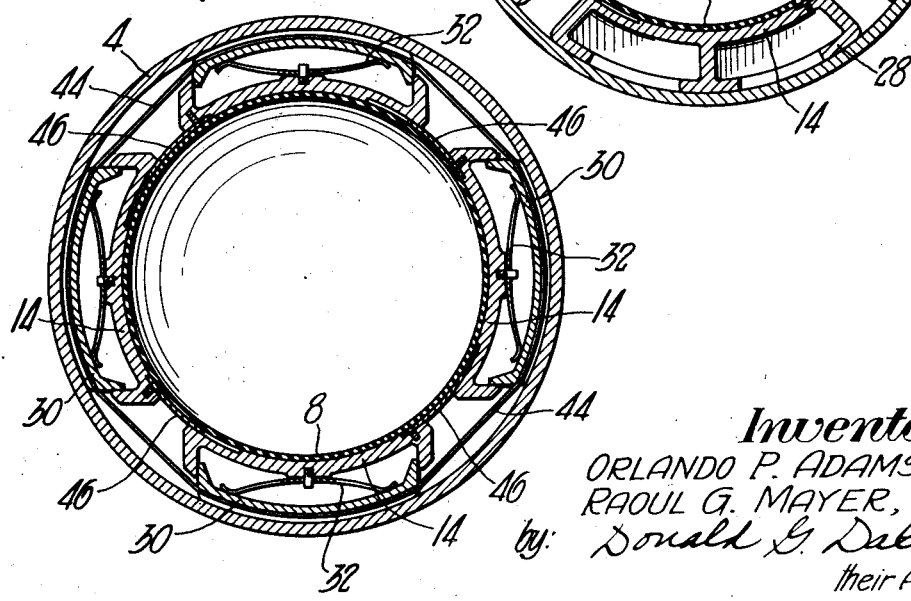

2,615,414

UNITED STATES PATENT OFFICE 2,615,414

INTERNAL PIPE ALIGNING CLAMP

Orlando P. Adams, McKeesport, Pa., and Raoul G. Mayer, Hendersonville, N. C., assignors to United States Steel Company, a corporation of New Jersey Application January 28, 1949, Serial No. 73,253

3 Claims. (Cl. 113—103)

This invention relates to pipe holding clamps and more particularly to an internal pipe holding clamp for aligning and holding pipe sections in position for welding.

In the welding of pipe lines or the handling of a plurality of cylindrical sections there has always been present the problem of properly aligning the pipe or cylindrical sections to permit the joining thereof by a good weld or to facilitate the performance of any work thereon. Internal and external clamps have been used for this purpose but these devices of the prior art have been generally suitable only for aligning sections having perfectly symmetrical ends. For example, they have not been found satisfactory for use in welding a pipe section having ends which are not perfectly concentric with the end of the line pipe to which it is to be welded.

Since in the handling of the many lengths of pipe necessary for a long pipe line it often happens that the open ends of the pipe become out of round or even show some variation in inside diameter or outside diameter, therefore, the need existed, prior to our invention, for a clamp that would automatically compensate for any such variation in the dimensions of the pipe ends to be joined.

It is accordingly an object of our invention to provide a clamp which permits proper alignment of a plurality of cylindrical sections.

It is a further object of our invention to provide an inner pipe holding clamp which permits alignment of pipe whose ends are not perfectly concentric with each other in an automatic manner.

Another object of our invention is to provide a mobile and collapsible internal pipe holding clamp which functions automatically to compensate for pipe end variations while aligning the axes of two pipes to be welded.

These and other objects will become more apparent after referring to the following specification and attached drawings, in which:

Figure 1 is a longitudinal section showing the clamp of our invention holding a pipe section and line pipe in position for welding;

Figure 2 is a partial longitudinal section showing the clamp in collapsed position;

Figure 3 is an end view taken on the line III—III of Figure 1;

Figure 4 is a cross-sectional view taken on the line IV—IV of Figure 1; and

Figure 5 is a cross-sectional view taken on the line V—V of Figure 1.

Referring more particularly to the drawings, reference numeral 2 indicates a line pipe to which a pipe section 4 is to be welded. The clamp of our invention consists essentially of a collapsible bag 8, preferably made of neoprene or a similar elastomer which is resistant to hydrocarbons; two end plates 10 and 12, disposed adjacent the ends of bag 8; and four longitudinally extending ring segments 14. End plates 10 and 12 are provided with slots 16 for receiving eight tap bolts 18 which project from the ends of the segments. Two lock nuts 20 are threaded around the ends of each of the tap bolts 18 in order to control the clearance between each end of the segments 14 and the circular plates 10 and 12 so as to provide a floating mounting for the segments. With this arrangement the segments 14 positively maintain their relative positions, are free to move radially in conformance with the expansion of bag 8, and at the same time hold the end plates 10 and 12 in position to thereby limit the longitudinal expansion of bag 8.

An opening 22 is provided through the center of end plate 12 for an air line 24 which communicates with an air inlet 26 in the outer end of bag 8.

Each of the segments 14 is composed of two solid shoe members 28 and one expansible shoe member 30. Each shoe member 30 is provided with an inner spring 32 which tends to expand the shoe into contact with the inner wall of pipe section 4. Thus the shoes 30 will automatically compensate for dimensional variations between the inside diameter or wall thickness of pipes 2 and 4 while aligning them for welding.

Two rollers 34 are fastened to each of the end plates 10 and 12 to permit the clamp to be easily moved within the pipe. Guards 36 and 38 project outwardly from end plates 10 and 12 to protect the clamp as it is being moved within the pipes. Two hooks 40 are provided on the outer face of end plate 12. A rope or cable 42 having one split end is fastened by its split ends to the hooks 40 and extends therefrom to beyond the free end of pipe section 4. Cable 42 is used for pulling the clamp through the pipe. Elastic bands 44 and 45, which encircle the ends of the segments 14, are provided to bring the segments together and hold them thus within the limits of slots 16 when bag 8 is deflated. This arrangement insures a compact mobile package which can be easily moved through the pipes.

In operation the clamp is inserted in the end of line pipe 2 so that the solid shoes 28 of the segments 14 are positioned within the line pipe 2 and the expansible shoe 30 projects outwardly therefrom. The pipe section 4, which is to be welded to the line pipe 2, is then placed over the projecting end of the clamp into abutting position against the end of the line pipe 2. Bag 8 at this time is in collapsed condition and the four segments 14 are held together by the elastic bands 44 and 45. After the clamp has been properly positioned within the line pipe 2 and the pipe section 4, air is introduced through air line 24 and air inlet 26 into bag 8 to inflate it.

The inflation is continued until the shoe bearing segments 14 are expanded into inner pipe surface engagement.

The expansible shoe members 30, located within the end of pipe section 4, will allow segments 14 to have the correct alignment with the inside surface of line pipe 2 even though the inside diameter or wall thickness of pipe section 4 may vary from the size of the end of the line pipe 2. Bag 8 is maintained in the inflated position until the welding has been completed.

After the weld has been made, bag 8 is simply deflated and the clamp is moved by means of the rope 42 to the open end of the pipe section 4 which has just been welded. Thus, it is placed in the proper location ready for the next welding operation. The next pipe to be welded is placed end to end with the pipe section 4 and held in place while the bag 8 is again inflated and the operation repeated.

In order to prevent bag 8 from being pinched or damaged in any way by the segments 14, a radial plate 46, which is fastened to a segment at only one end, is provided on the bottom side of each segment so that the bag is prevented from entering the spaces between the segments 14 when the segments are expanded and separated in pipe engaging position.

The clamp can be adjusted for use with other sizes of pipe by changing the size of the segments 14 or adding an extension to the shoe members.

Although we have described our invention as being used for aligning pipe sections for welding it is not intended to imply that its use is limited to only metallic pipe sections. It can be used for aligning and holding two or more cylindrical sections of any type of material, e. g., cement pipe, which is currently being utilized in the oil fields to augment the scarce supply of steel pipe.

While one embodiment of our invention has been shown and described it will be apparent that other adaptations and modifications may be made without departing from the scope of the following claims.

We claim:

1. An inner clamp for aligning a pipe section with a line pipe, a portion of said clamp being adapted to fit into the end of said line pipe and the remainder being adapted to fit into the adjoining end of said pipe section, said clamp comprising an inflatable bag having an air inlet in one end thereof, a rigid arcuate end plate adjacent each end of said bag, said end plates having spaced apart radial slots in the circumferences thereof, one of said end plates having an air port therethrough in communication with said air inlet, a plurality of inner pipe surface engaging shoe segments extending longitudinally between said end plates with the ends thereof resting in said slots, a resilient shoe on the pipe section fitting portion of each of said shoe segments including a substantially U-shaped cradle, a plate member slidably mounted within said U-shaped cradle, spring means for urging said plate member radially outward of said U-shaped cradle, said inflatable bag being adapted to raise said shoe segments into engagement with the inner walls of said pipe section and of said line pipe when inflated, and at least one elastic band extending circumferentially around said shoe segments for holding said segments in compact relationship when said inflatable bag is deflated and retaining said last named plate member within said U-shaped cradle.

2. An inner clamp according to claim 1 characterized by at least one tap bolt attached to and projecting from each end of said shoe segments, said tap bolts being slidably mounted in said slots and projecting outwardly therefrom, means cooperating with said bolts to hold said end plate against the ends of said shoe segments.

3. An inner clamp for aligning a pipe section with a line pipe, a portion of said clamp being adapted to fit into the end of said line pipe and the remainder being adapted to fit into the adjoining end of said pipe section, said clamp comprising an inflatable bag having an air inlet in one end thereof, a rigid arcuate end plate adjacent each end of said bag, said end plates having spaced apart radial slots in the circumferences thereof, one of said end plates having an air port therethrough in communication with said air inlet, a plurality of inner pipe surface engaging shoe segments extending longitudinally between said end plates, at least one tap bolt attached to and projecting from each end of said shoe segments, said tap bolts being slidably mounted in said slots and projecting outwardly therefrom, means cooperating with said bolts to hold said end plate against the ends of said shoe segments, a resilient shoe on the pipe section fitting portion of each of said shoe segments including a substantially U-shaped cradle, a plate member slidably mounted within said U-shaped cradle, and spring means for urging said plate member radially outward of said U-shaped cradle, at least one elastic band extending circumferentially around said shoe segments for holding said segments in compact relationship when said inflatable bag is deflated and retaining said last named plate member within said U-shaped cradle, an arcuate plate member affixed to the bottom surface of each of said shoe segments for preventing pinching of said inflatable bag when deflated, rollers attached to each end plate for allowing said clamp to be withdrawn through said pipe section, angularly shaped guard means projecting outwardly from each end plate for protecting said clamp while being withdrawn through said pipe section, and means extending from the pipe section fitting end of said clamp through said pipe section whereby said clamp member is pulled through said pipe section when said inflatable bag is deflated.

ORLANDO P. ADAMS.
RAOUL G. MAYER.

REFERENCES CITED

The following references are of record in the file of this patent:

UNITED STATES PATENTS

| Number | Name | Date |
| --- | --- | --- |
| 1,710,258 | Hume | Apr. 23, 1929 |
| 1,846,438 | Richter | Feb. 23, 1932 |
| 1,878,725 | Stovall | Sept. 20, 1932 |
| 1,884,144 | Norquist | Oct. 25, 1932 |
| 1,962,351 | Kane | June 12, 1934 |
| 2,004,787 | Gillette | June 11, 1935 |
| 2,167,338 | Murcell | July 25, 1939 |
| 2,353,868 | Bisbee | July 18, 1944 |
| 2,452,867 | Price | Nov. 2, 1948 |

FOREIGN PATENTS

| Number | Country | Date |
| --- | --- | --- |
| 184,638 | Great Britain | Aug. 22, 1922 |